United States Patent [19]

Katoh et al.

[11] Patent Number: 5,332,457
[45] Date of Patent: Jul. 26, 1994

[54] PROCESS FOR PRODUCING CARPET

[75] Inventors: Naoyuki Katoh, Mie; Kenzou Ichihashi, Osaka, both of Japan

[73] Assignee: Mitsubishi Yuka Badische Co., Ltd., Yokkaichi, Japan

[21] Appl. No.: 28,144

[22] Filed: Mar. 9, 1993

[30] Foreign Application Priority Data

Mar. 12, 1992 [JP] Japan .................................. 4-087474
Mar. 12, 1992 [JP] Japan .................................. 4-087475
Nov. 26, 1992 [JP] Japan .................................. 4-337875
Dec. 9, 1992 [JP] Japan .................................. 4-351530

[51] Int. Cl.$^5$ ........................... D06N 7/00; C04B 24/26
[52] U.S. Cl. ........................................ 156/072; 524/5; 427/412; 428/95
[58] Field of Search ................. 524/5, 8, 2; 156/72, 156/314; 427/403, 412; 428/95-97

[56] References Cited

U.S. PATENT DOCUMENTS

| | | |
|---|---|---|
| 3,414,458 | 12/1968 | Lacy et al. |
| 4,239,563 | 12/1980 | Iacoviello ............................ 156/72 |
| 4,710,526 | 12/1987 | Tokumoto et al. |
| 4,808,459 | 2/1989 | Smith et al. |
| 5,069,721 | 12/1991 | Tamura et al. ..................... 524/5 X |

FOREIGN PATENT DOCUMENTS

| | | | |
|---|---|---|---|
| 0401200 | 12/1990 | European Pat. Off. | |
| 125049 | 12/1967 | Fed. Rep. of Germany. | |
| 56-155211 | 12/1981 | Japan ............................ | 524/5 |
| 57-56357 | 4/1982 | Japan ............................ | 524/5 |
| 59-13686 | 1/1984 | Japan ............................ | 524/5 |
| 59-199730 | 11/1984 | Japan ............................ | 524/5 |
| 60-171260 | 9/1985 | Japan ............................ | 524/2 |
| 61-72662 | 4/1986 | Japan ............................ | 524/5 |
| 62-299582 | 12/1987 | Japan ............................ | 156/72 |
| 1070129 | 1/1984 | U.S.S.R. ......................... | 524/5 |

OTHER PUBLICATIONS

Database WPIL, Derwent Publications Ltd., AN-85-162990, JP-A-60 094 470, May 27, 1985.
Database WPIL, Derwent Publications Ltd., AN-91-106983, JP-A-3 050 145, Mar. 4, 1991.
Database WPIL, Derwent Publications Ltd., AN-88-040162, JP-A-62 299 582, Dec. 26, 1987.
Chemical Abstracts, vol. 102, No. 24, AN-205390y, JP-A-59 199 730, Nov. 12, 1984.

Primary Examiner—Jeff H. Aftergut
Attorney, Agent, or Firm—Oblon, Spivak, McClelland, Maier & Neustadt

[57] ABSTRACT

A process for producing a carpet is disclosed, comprising laminating a backing material composition comprising 100 parts by weight, on a resin solid basis, of an aqueous emulsion of a resin having a glass transition point of not higher than 5° C., from 120 to 400 parts by weight of hydraulic inorganic cement, and up to 600 parts by weight of a non-hydraulic inorganic filler on a carpeting surface base material and heating the laminate to harden and dry the backing material composition. A carpet in which a carpeting surface base material and a backing material (and a carpeting back base material, if used) are firmly and integrally bonded can easily be obtained. The carpet has excellent properties, such as flexibility (softness), dimensional stability (resistance to shrinkage), fit to a floor, and workability, in a good balance. Where a carpeting surface base material previously coated with a coating composition comprising a specific aqueous resin emulsion is used, a higher temperature can be applied in hardening and drying, which leads to increased productivity, and the resulting carpet has excellent pull strength of pile.

12 Claims, No Drawings

PROCESS FOR PRODUCING CARPET

FIELD OF THE INVENTION

This invention relates to a process for producing a carpet and more particularly a carpet which can be laid on even an uneven floor with close contact, has excellent flexibility and excellent dimensional stability, and hardly warps.

BACKGROUND OF THE INVENTION

Backing materials of carpets include asphalt type and polyvinyl chloride resin type materials. Asphalt type materials involve problems that give an offensive odor, become stiff in the winter, and, in high temperatures, are softened to contaminate the surroundings or undergo thermal deterioration. Polyvinyl chloride resin type materials involve an environmental problem that harmful chlorine gas is given off on combustion of disposing them.

In order to overcome these problems of the conventional carpet backing materials, it has been proposed to use a sheet formed from a composition comprising cement and a thermoplastic resin emulsion, which is adhered to the reverse side of carpeting surface base material with an adhesive, as disclosed in JP-B-60-58347 (the term "JP-B" as used herein means an "examined published Japanese patent application"). According to this method, since the cement becomes brittle if abruptly exposed to a high temperature, the sheet must be harden and dried slowly enough, resulting in poor productivity. Moreover, the resulting carpet is too hard and lacks flexibility.

SUMMARY OF THE INVENTION

An object of the present invention is to provide a process for easily producing a carpet which is excellent in softness, flexibility, resistance to shrinkage, and has dimensional stability, is relatively light, and is easily brought into intimate contact with a floor surface even with unevenness, and hardly undergoes warp during use.

The object of the present invention is accomplished by a process for producing a carpet comprising laminating a backing material composition comprising 100 parts by weight, on a resin solid basis, of an aqueous emulsion of a resin having a glass transition point (Tg) of not higher than 5° .C, from 120 to 400 parts by weight of hydraulic inorganic cement, and up to 600 parts by weight of a non-hydraulic inorganic filler on a carpeting surface base material and heating the laminate to harden and dry the backing material composition.

DETAILED DESCRIPTION OF THE INVENTION

The carpeting surface base materials which can be used in the present invention include tufted carpets, needle punched carpets, spun-bonds, rough felt, and woven or nonwoven fabrics made of various synthetic fibers, e.g., polypropylene, polyethylene, polyethylene terephthalate, and nylon, or natural fibers, e.g., cotton, hemp, wool, etc.; and woven or nonwoven glass fabrics. In particular, nylon carpets using a polyester as a primary base cloth are preferred for their small shrinkage.

Back base materials, if used in the carpets of the present invention, include the same materials as enumerated above as surface base materials and, in addition, paper materials, such as Japanese paper.

For increasing drying properties on hardening and drying, it is preferable that at least one of the surface base material and the back base material, preferably the base material which is on the upper side while being press-bonded, hardened and dried, is permeable to water. Further, in order to prevent warp of the carpet, it is preferable that the surface base material and the back base material, if used, have a substantially equal percent heat shrinkage or the back base material has a higher percent shrinkage than that of the surface base material.

The aqueous emulsion of a resin having a Tg of not more than 5° C. which can be used in the backing material composition is obtained by emulsion polymerization of one or more unsaturated monomers giving homopolymers of various Tg's. Examples of such monomers (and the Tg of their homopolymers; shown in parentheses) are 2-ethylhexyl acrylate ($-85°$ C.), n-butyl acrylate ($-54°$ C.), ethyl acrylate ($-22°$ C.), vinylidene chloride ($-18°$ C.), isopropyl acrylate ($-5°$ C.), 2-ethylhexyl methacrylate ($-5°$ C.), n-propyl acrylate (8° C.), n-butyl methacrylate (20° C.), vinyl acetate (30° C.), acrylic acid (87° C.), n-propyl methacrylate (81° C.), styrene (100° C.), acrylonitrile (100° C.), methyl methacrylate (105° C.), methacrylic acid (130° C.), maleic anhydride, itaconic acid (130° C.), acrylamide (153° C.), ethyl methacrylate (65° C.), vinyl chloride (79° C.), ethylene, and butadiene.

In general, an approximate Tg of a copolymer can easily be anticipated from the Tg of the homopolymer of each monomer and a copolymerization ratio of the monomers. Accordingly, an aqueous emulsion of a resin having a desired Tg (not higher than 5° C.) can easily be prepared by repeating experiments designed based on the thus anticipated approximate Tg.

The resin of the aqueous emulsion in the baking material composition may be either a homopolymer or a copolymer as long as it has a Tg of not higher than 5° C. The aqueous resin emulsion may be a mixture of two or more resin emulsions. The resin emulsion may also be a so-called powder emulsion which is prepared by re-dispersing a water-dispersible resin powder prepared from a resin emulsion in an aqueous medium.

If the Tg of the resin emulsion in the backing material composition is higher than 5° C., the resulting carpet becomes hard. If it is too low, the resulting carpet'has poor dimensional stability and poor resistance to deformation with water. A preferred Tg range of the resin is from $-50°$ to 0° C.

The hydraulic inorganic cement which can be used in the backing material composition includes those called Portland cement (e.g., common cement, white cement, rapid-hardening cement, and ultra-rapid-hardening cement), those called mixed cement (e.g., blast furnace cement, silica cement, and fly ash cement), alumina cement, and hydraulic gypsy powder. Portland cement, particularly common cement or white cement is usually preferred.

The hydraulic inorganic cement is used in an amount of from 120 to 400 parts by weight, and preferably from 160 to 300 parts by weight, per 100 parts by weight of the resin solid content of the aqueous resin emulsion. If the proportion of the cement is less than 120 parts, the resulting carpet has excellent softness but poor elasticity, poor strength, and poor dimensional stability. If the cement proportion exceeds 400 parts, the carpet becomes hard and has reduced water resistance.

The non-hydraulic inorganic filler which can be used in the backing material composition includes various kinds, for example, calcium carbonate, silica sand, talc, clay, aluminum hydroxide, and other various inorganic extenders.

The non-hydraulic inorganic filler in the backing material composition is used in an amount of from 0 to 600 parts by weight, and preferably from 0 to 460 parts by weight, per 100 parts by weight of the resin solid content of the aqueous resin emulsion. According as the proportion of the non-hydraulic inorganic filler decreases, the resulting carpet becomes soft and sticky and tends to have deteriorated dimensional stability. If the proportion is too high, the carpet becomes hard and reduces its water resistance. While the non-hydraulic inorganic fillers include in the scope thereof inorganic pigments for coloring, the amount of such fillers to be used is in general relatively small.

If desired, the backing material composition may further contain inorganic expanded particles, such as Shirasu balloons and expanded glass balloons, or organic expanded particles, such as expanded polystyrene beads.

The backing material composition contains an adequate amount of water. A preferred water content in the backing material composition ranges from 100 to 300 parts by weight per 100 parts by weight of the resin solid content. The water may be the water content of the resin emulsion, but in many cases water is externally added. In general, with too a low water content, the composition has poor fluidity for coating workability. With too high a water content, the composition not only suffers from separation into the aqueous resin emulsion and other components but causes cracks or shrinkage of carpet after hardening and drying it.

If desired, the backing material composition may furthermore contain other additives, such as pigments or dyes for coloring, fibrous powders, antifoamer, plasticizers, thickeners, antifungal agents, water decreasing agents, flow modifiers, hardening control agents, wetting agents, dispersing agents, emulsifying agents, antifreezing agents, and flame retardants; or reinforcing materials, such as a glass net and a resin net. Usage of these optional components being known in the art, the details therefor are omitted. As previously described, the inorganic pigments for coloring are included under non-hydraulic inorganic fillers but are usually used in a small proportion.

The backing material composition of the present invention may be used in combination with other aqueous resin emulsions. This being the case, however, the resin solid content of the above-described aqueous resin emulsion should be at least 60% by weight based on the total resin solid content.

According to the present invention, a laminate of the above-described carpeting surface base material and the backing material composition is prepared, and the laminate is heated preferably at a temperature of from 65° to 155° C. to harden and dry the backing material composition thereby to obtain a carpet comprising the surface base material having firmly and integrally adhered to the back side thereof a hardened layer of the backing material composition, i.e., a carpet backed with a backing material layer.

The process for producing a carpet according to the present invention will be explained in detail with reference to two embodiments.

A first embodiment is characterized by the use of a carpeting back base material. The backing material composition is coated on a carpeting surface base material and/or a carpeting back base material, the two base materials are press-bonded before hardening and drying the backing material composition, and then the resulting laminate is heated to harden and dry the backing material composition.

The content of the non-hydraulic inorganic filler in the backing material composition preferably ranges from 250 to 460 parts by weight per 100 parts by weight of the resin solid content of the resin emulsion. Where the above-mentioned expanded particles are used, the backing material composition preferably contains from 20 to 200 parts by weight of the expanded particles and from 0 to 300 parts by weight of the non-hydraulic inorganic filler each per 100 parts by weight of the resin solid content of the emulsion.

From the standpoint of flame retardance of a carpet and miscibility with other components, inorganic expanded particles are preferred to organic expanded particles. The expanded particles function to make the hardened backing material layer porous. By the use of the expanded particles, the density of the hardened backing material layer can easily be reduced to 1 g/cm$^3$ or less, thereby making a contribution to weight reduction of a carpet. Further, the expanded particles are effective to improve fluidity of the backing material composition even having a low water content. Furthermore, they facilitate evaporation of excess water (more water than necessary for hydraulic setting) on hardening and drying of the backing material composition to achieve rapid dry.

The expanded particles have a particle size of from 10 to 800 μm, and preferably from 20 to 500 μm. If the particle size is too large, uniform mixing for preparation of the backing material composition is difficult, and also the composition fails to provide a backing material layer having sufficient quality from the limit of the layer thickness. If the particle size is too small, a sufficient weight reduction is hardly accomplished, and too a large surface area of the particles deteriorates miscibility with other components.

The expanded particles are used in an amount of from 20 to 200 parts by weight, and preferably from 30 to 150 parts by weight, per 100 parts by weight of the resin solid content of the aqueous resin emulsion. As the proportion of the expanded particles decreases, the weight reduction becomes insufficient; the resulting carpet becomes sticky; and the backing material composition has reduced drying properties, resulting in an increase of drying time. If the proportion is too high, the backing material layer is hard and brittle and has reduced water resistance.

The surface base material and the back base material, either one or both of them having coated thereon the backing material composition, are laid on each other with the unhardened backing material composition coating layer being interposed therebetween and press-bonded to each other. The laminate is then heated at a temperature of from 95° to 155° C. to harden and dry the coating layer. There is thus obtained a final carpet product comprising the surface base material and the back base material firmly and integrally adhered to each other via a hardened layer of the backing material composition, i.e., a carpet backed with a backing material layer. If the hardening and drying temperature exceeds 155° C., the base fiber, e.g., polypropylene fiber, tends to undergo thermal deterioration, and the backing layer tends to suffer from blisters.

According to this embodiment, the backing material composition is dried hard with a part of it having penetrated among fibers of the surface and back base materials to thereby achieve firm and integral adhesion of the base materials.

In a second embodiment of the present invention, a coating composition comprising an aqueous emulsion of a resin having a Tg of from $-10°$ to $30°$ C. is previously coated on a surface base material on the side to be coated with the backing material composition so as to improve various properties as a carpet. The aqueous emulsion in the coating composition is hereinafter referred to as emulsion B, while the aqueous emulsion in the backing material composition is hereinafter referred to as emulsion A. The coating composition-coated side of the surface base material is then laminated with the backing material composition, and the laminate is heated to harden and dry.

The resin of emulsion B in the coating composition which can be coated on the surface base material has a Tg of from $-10°$ to $30°$ C., and preferably from $5°$ to $25°$ C. If the Tg of the resin exceeds $30°$ C., the coated layer becomes hard even with the combined use of a plasticizer. It tends to follow that fillers, etc. come off the surface base material when the carpet is bent. If, on the other hand, the Tg of the resin is less than $-10°$ C., the resulting carpet has reduced water resistance, reduced shrinkage resistance, or reduced pull strength of pile, or tends to undergo blocking, causing contamination. It is preferable that the Tg of the resin of emulsion B is higher than that of the resin of emulsion A of the backing material composition by at least $10°$ C.

Emulsion B of the coating composition can be prepared from unsaturated monomers which can be used for the preparation of emulsion A of the backing material composition.

While the coating composition may solely comprise emulsion B, it preferably contains from 100 to 400 parts by weight of a non-hydraulic inorganic filler, such as calcium carbonate, aluminum hydroxide, talc, clay or silica sand, per 100 parts by weight of the resin solid content. Addition of such a filler is effective for prevention of carpet shrinkage and for improving toughness and punchability.

The coating composition, which may contain a filler as mentioned above, is preferably coated in an amount of from 80 to 450 g/m$^2$ on a solid basis for obtaining satisfactory adhesion to the backing material composition, improving carpet strength, and improving pull strength of pile. Sufficient improvements in adhesion between the coating composition-coated surface base material and the backing material composition and in pull strength of pile cannot be obtained unless the coating composition-coated surface base material and the backing material composition are laminated before hardening and drying of the backing material composition.

It is desirable for enhancement of adhesion and pull strength of pile that the laminating of the coating composition-coated surface base material and the backing material composition be conducted before drying of the coating composition.

Laminating of the coating composition-coated surface base material and the backing material composition may be carried out by various methods. Typically, the backing material composition is previously formed into a sheet, and the backing material composition sheet and the coating composition-coated surface base material are laid on each other via the coating composition layer (method A). In another method, the backing material composition is coated on a back base material, and the coated back base material and the coating composition-coated surface base material are laminated (method B). In a still another method, the coating composition is coated on a surface base material, and the backing material composition is directly coated or spread on the coating composition layer of the surface base material to form a laminate (method C).

In method A, a backing material composition is formed into a sheet by any forming method, for example, by coating the backing material composition on a substrate coated with a release agent. Usable substrates include a plate (e.g., an iron plate or a like metal plate, a glass plate, a ceramic plate, a synthetic resin plate or a plywood laminate), a film (e.g., a synthetic resin film) or a sheet (a synthetic resin sheet, a paper sheet, a woven fabric, glass cloth or carbon fiber cloth). Release agents to be coated on the substrate include parting oil or parting grease applicable to mortar or concrete forming. A synthetic resin film or sheet may be rendered releasable by a surface treatment with a silicone resin or a fluorine resin. A paper or woven sheet may be rendered releasable by a surface treatment with a silicone resin or a fluorine resin or by laminating a film having release properties.

A wet thickness (before hardening and drying) of the backing material composition which is coated on the substrate with release properties (according to method A) or a back base material (according to method B) to form a backing material composition sheet or layer is from 0.5 to 5.0 mm, and preferably from 0.8 to 4.0 mm. If the coating thickness is too thin, the resulting carpet has insufficient cushioning, does not fit the unevenness of the floor, and gives an unpleasant feel on walking thereon. If the thickness is too thick, the backing material composition requires a long time for hardening and drying to reduce productivity.

The coating composition-coated surface of the surface base material and the thus formed backing material composition sheet or layer are brought into contact and press-bonded before the backing material composition is hardened and dried and either before or after the coating composition is dried, and then heated to harden and dry the backing material composition. Where the surface base material and the backing material composition sheet or layer are laminated while the coating composition is wet, the coating composition is also dried at the same time. There is thus obtained a final carpet product comprising the surface base material having firmly and integrally adhered thereto a hardened sheet or layer of the backing material composition, i.e., a carpet backed with a backing material.

The press-bonding of the laminate of the backing material composition sheet or layer and the coating composition-coated surface base material is sufficiently carried out by lightly applying pressure through nip rolls.

The hardening and drying temperature after press-bonding preferably ranges from $130°$ to $155°$ C. where the coating composition-coated surface base material and the backing material composition are laminated while the coating composition is wet, or from $90°$ to $125°$ C. where the laminating is after drying of the coating composition. If the temperature is too low, the hardening and drying require a long time. If it is too high, the resulting carpet is apt to suffer from blisters between the backing material composition layer and the surface base material.

In the above-mentioned second embodiment, the content of the non-hydraulic inorganic filler in the backing material composition preferably ranges from 160 to 460 parts by weight per 100 parts by weight of the resin solid content. If the proportion is too low, the carpet becomes soft, assumes stickiness, and has poor dimensional stability. If the proportion is too high, the carpet becomes hard and has insufficient water resistance.

According to the process of the present invention, since the backing material composition is hardened and dried with a part of its aqueous resin emulsion A or emulsion B having been penetrating among fibers of a surface base material, there is obtained at high efficiency and with ease, a carpet in which the backing material and the surface base material adhere firmly and integrally. The carpet of the present invention exhibits high strength, flexibility (softness), dimensional stability (shrinkage resistance), a property to fit the floor, and workability in laying in a good balance.

Since hardening and drying of the backing material composition is effected in a high temperature after press-bonding to a surface base material, the hardening and drying time can be shortened to improve productivity while causing no reduction in strength of the backing material composition layer. In general, hardening and drying of ordinary cement compositions by heating in a high temperature requires moistening or use of an autoclave so as to prevent dry-out of the water-containing cement during the high-temperature heating. In the present invention, to the contrary, because the water-containing cement is subjected to heating while being entrapped in the resin emulsion, the water necessary for hydraulic setting is inhibited from rapidly evaporating even when heated in a relatively high temperature. The resin emulsion having been formed into a film to a moderate extent also suppresses evaporation of water to retain the water content for a given period of time. Further, such a relatively high heating temperature brings about a reduction in time required for hydraulic setting. Owing to all these effects in cooperation, the hydraulic reaction and drying complete rapidly while preventing dry-out of the water-containing cement even in a high temperature to thereby form the high strength backing material layer comprising resin-containing hardened cement in a reduced time.

Further, since the hardened backing material composition layer contains therein a number of voids resulting from steam generated on high temperature heating, it is light as having a density of from 0.8 to 1.2 g/cm³, excellent in cushioning effect, and gives a satisfactory feel on walking thereon.

Furthermore, the carpet obtained by the process of the present invention does not always need a back base material (underlay cloth) as is required for those widely used today whose backing material is made of asphalt type materials, polyvinyl chloride resin type or amorphous polypropylene resin type. The carpet of the present invention in the case of using no back base material exhibits excellent punchability, has increased productivity on account of omission of the steps involved for a back base material, and can easily be disposed of by combustion with a low heat release value without giving off harmful gas.

The present invention is now illustrated in greater detail with reference to Test Examples, but it should be understood that the present invention is not deemed to be limited thereto. All the percents and parts are by weight unless otherwise indicated.

TEST EXAMPLE 1

Surface Base Material

A loop pile tufted carpet comprising, as a primary base cloth, plain weave fabric of polypropylene flat yarns through which polypropylene yarns are interlocked (basis weight: 1000 g/m²; width: 1.6 m) (hereinafter referred to PP tufted).

Back Base Material

A polypropylene spun-bond nonwoven fabric ("Sintex PS-106" produced by Mitsui Petrochemical Industries, Ltd.; basis weight: 30 g/m²; width: 1.6 m) (hereinafter referred to as PP spun-bond).

Backing Material Composition

| | |
|---|---|
| Aqueous emulsion of acrylic ester-styrene copolymer resin ("Acronal S-400" produced by Mitsubishi Yuka Badische Co., Ltd.; resin solid content: 57%; resin's Tg: ≦0° C.) | 100 parts (on resin solid basis) |
| Common Portland cement | 200 parts |
| Calcium carbonate ("KD-80" produced by Dowa Mining Co., Ltd.) | 100 parts |
| Shirasu balloons ("WINLITE SB-9011" produced by Ijichi Kasei Co., Ltd.) | 100 parts |
| Water | 40 parts |

The above components for a backing material composition were mixed with a stirrer until no agglomerate was observed (about 15 minutes). The resulting slurry of the backing material composition was coated on the back side of the above surface base material with a knife coater to a wet thickness of 2.5 mm and immediately thereafter the above back base material was superposed thereon. The laminate was passed through a pair of nip rolls to lightly apply pressure so that the backing material composition might penetrate among fibers of the back base material.

The laminate was hardened and dried by applying hot air at 120° C. from the back base material side for 30 minutes, followed by cooling with cold air for 10 minutes to obtain a carpet. The carpet was press-cut to a size of 50×50 cm to prepare a tile carpet sample. The hardened backing material layer had a density of 0.68 g/cm³.

TEST EXAMPLE 2

Surface Base Material

A polyester-nylon tufted carpet using a polyester nonwoven cloth as a primary base cloth (basis weight: 1000 g/m²) (hereinafter referred to PET/PET-nylon tufted).

Back Base Material

A polyester spun-bond nonwoven fabric ("Sintex R-24" produced by Mitsui Petrochemical Industries, Ltd.; basis weight: 69 g/m²) (hereinafter referred to as PET spun-bond).

Backing Material Composition

| | |
|---|---|
| Aqueous emulsion of acrylonitrile- | 100 parts |

-continued

| | |
|---|---|
| acrylic ester copolymer resin ("Acronal 80 DN" produced by Mitsubishi Yuka Badische Co., Ltd.; resin solid content: 50%; resin's Tg: ≦0° C.) | (on resin solid basis) |
| White cement | 200 parts |
| WINLITE SB-9011 | 100 parts |
| Silica sand (No. 8) | 100 parts |
| Iron oxide (black) ("2 DB" produced by Nihon Bengara Kogyo Co., Ltd.) | 1 part |
| Water | 50 parts |

A tile carpet sample was prepared in the same manner as in Test Example 1 by using the above surface base material, back base material, and backing material composition. The hardened backing material layer had a density of 0.68 g/cm$^3$.

TEST EXAMPLES 3 TO 16

A tile carpet sample was prepared in the same manner as in Test Example 1, except for making alterations as shown in Table 1 below.

Each of the samples obtained in Test Examples 1 to 16 was tested according to the following methods. The results obtained are shown in Table 2.

1) Softness

The sample was bent through 180° along a mandrel having a diameter of 50 mm with its surface base material inside. Cracks, layer separation or any other disorders were visually observed and rated as follows. The test was conducted at 70° C. or −5° C.

1 No disorder was observed at all.
2 No visual disorder was observed, but it took some time for the bent portion to recover.
3 A bend mark (fold) was left.
4 The sample was folded and never recovered.

2) Fit to Floor

The sample was kept rolled for 2 hours, unrolled by its own recovery, placed on 10 mm thick plywood, and allowed to stand there at 20° C. for 2 hours. The surface of the sample was lightly touched on with a finger tip, and the lifting of the sample from the plywood was examined and rated as follows.

1 The sample completely fitted the plywood.
2 The sample fitted the plywood almost completely.
3 Slight lifting from the plywood and upward warp of the edges were observed.
4 The sample lifted from the plywood and sounded when pushed down.

Shrinkage

The sample was allowed to stand in air at 60° C. or 50° C. and 90% RH for 7 days or immersed in water at 40° C. or 20° C. for 7 days, and the change of the condition was examined and rated as follows.

1 No change at all.
2 Slightly became hard.
3 Became hard.
4 Deformed or became brittle.

4) Feel to the Touch

The sample was placed on 10 mm thick plywood with its back side up. When the sample was pressed under a load of 5 kg/cm$^2$ and then relieved, the compressive deformation of the sample was examined and evaluated as follows.

H No compressive deformation observed (hard)
S Compressive deformation observed (soft)

TABLE 1

| Test Example No. | Backing Material Composition | | | | Production Conditions | | | | | Hardened Backing Material Thickness (mm) |
|---|---|---|---|---|---|---|---|---|---|---|
| | Resin Emulsion (Tg of Resin) (part*) | Hydraulic Inorganic Cement (part) | Expanded Particles (SHIRASU Balloons) (part) | Non-hydraulic Inorganic Filler (part) | Surface Base Material | Back Base Material | Backing Material Wet Thickness (mm) | Hardening and Drying Conditions | | |
| | | | | | | | | Temp. (°C.) | Time (min) | |
| 1 | Acronal S-400 (≦0° C.) (100) | Portland cement (200) | 100 | calcium carbonate (100) | PP tufted | PP spun-bond | 2.5 | 120 | 30 | 2.0 |
| 2 | Acronal 80DN (≦0° C.) (100) | white cement (200) | 100 | silica sand (No. 8) (100) + iron oxide (1) | PET/PET• nylon tufted | PET spun-bond | " | " | " | " |
| 3 | Acronal S-400 (≦0° C.) (100) | Portland cement (140) | 100 | calcium carbonate (100) | PP tufted | PP spun-bond | " | " | 40 | " |
| 4 | Acronal S-400 (≦0° C.) (100) | Portland cement (400) | 150 | calcium carbonate (100) | PP tufted | PP spun-bond | " | " | 30 | " |
| 5 | Acronal S-400 (≦0° C.) (100) | Portland cement (200) | 100 | calcium carbonate (100) | PP tufted | PP spun-bond | 1.0 | " | 15 | 0.8 |
| 6 | Acronal S-400 (≦0° C.) (100) | Portland cement (200) | 20 | calcium carbonate (200) | PP tufted | PP spun-bond | 2.5 | 65 | 100 | 2.0 |
| 7 | Acronal YJ-3042** (3° C.) (100) | Portland cement (200) | 100 | calcium carbonate (100) | PP tufted | PP spun-bond | 2.5 | 120 | 30 | 2.0 |
| 8 | Acronal S-400 | Portland cement | 100 | calcium carbonate | PP tufted | PP spun-bond | " | 95 | 50 | " |

TABLE 1-continued

| Test Example No. | Resin Emulsion (Tg of Resin) (part*) | Hydraulic Inorganic Cement (part) | Expanded Particles (SHIRASU Balloons) (part) | Non-hydraulic Inorganic Filler (part) | Surface Base Material | Back Base Material | Backing Material Wet Thickness (mm) | Hardening and Drying Conditions Temp. (°C.) | Hardening and Drying Conditions Time (min) | Hardened Backing Material Thickness (mm) |
|---|---|---|---|---|---|---|---|---|---|---|
| | (≦0° C.) (100) | (200) | | (100) | | | | | | |
| 9 | Acronal S-400 (≦0° C.) (100) | Portland cement (200) | 100 | calcium carbonate (100) | PP tufted | PP spun-bond | " | 80 | 90 | " |
| 10 | Acronal S-400 (≦0° C.) (100) | Portland cement (200) | 150 | calcium carbonate (150) | PP tufted | PP spun-bond | " | 120 | 30 | " |
| 11 | Acronal S-400 (≦0° C.) (100) | Portland cement (200) | 100 | silica sand (No. 8) (150) | PP tufted | PP spun-bond | " | " | " | " |
| 12 | Acronal S-400 (≦0° C.) (100) | white cement (200) | 20 | — | PP tufted | PP spun-bond | " | " | " | " |
| 13 | Acronal S-400 (≦0° C.) (100) | Portland cement (100) | 20 | calcium carbonate (100) | PP tufted | PP spun-bond | 2.5 | 120 | 30 | 2.0 |
| 14 | Acronal S-400 (≦0° C.) (100) | Portland cement (450) | 300 | calcium carbonate (300) | PP tufted | PP spun-bond | " | " | " | " |
| 15 | Acronal S-400 (≦0° C.) (100) | Portland cement (200) | 100 | calcium carbonate (100) | PP tufted | PP spun-bond | " | 165 | " | " |
| 16 | Acronal S-400 (≦0° C.) (100) | Portland cement (100) | 220 | silica sand (No. 8) (100) | PP tufted | PP spun-bond | " | 120 | " | " |

Note:
*On a resin solid basis.
**Aqueous emulsion of acrylic ester-styrene copolymer produced by Mitsubishi Yuka Badische Co., Ltd.; solid content: 50%; resin's Tg: 3° C.)

TABLE 2

| Test Results | 1 | 2 | 3 | 4 | 5 | 6 | 7 | 8 |
|---|---|---|---|---|---|---|---|---|
| Softness at 70° C. | 1 | 1 | 1 | 2 | 1 | 2 | 2 | 1 |
| at −5° C. | 2 | 1 | 1 | 3 | 2 | 2-3 | 3 | 2 |
| Fit to Floor | 1 | 1 | 1 | 3 | 1 | 2 | 3 | 1 |
| Shrinkage: | | | | | | | | |
| in air, 60° C., 90% RH × 7 days | 1 | 1 | 2 | 2 | 1 | 1 | 1 | 1 |
| in air, 50° C., 90% RH × 7 days | 1 | 1 | 2 | 2 | 1 | 1 | 1 | 1 |
| in water, 40° C. × 7 days | 2 | 2 | 2 | 3 | 2 | 2 | 1 | 2 |
| in water, 20° C. × 7 days | 1 | 1 | 2 | 2 | 1 | 1 | 1 | 1 |
| Feel to the Touch | S | S | S | S-H | S | S-H | S-H | S |

| Test Results | 9 | 10 | 11 | 12 | 13 | 14 | 15 | 16 |
|---|---|---|---|---|---|---|---|---|
| Softness at 70° C. | 2 | 2 | 1 | 1 | 1 | 4 | * | 2 |
| at −5° C. | 2 | 3 | 2 | 1 | 1 | 4 | * | 3 |
| Fit to Floor | 2 | 3 | 1 | 1 | 1 | 4 | * | 4 |
| Shrinkage: | | | | | | | | |
| in air, 60° C., 90% RH × 7 days | 1 | 2 | 1 | 1 | 3 | 4 | * | 3 |
| in air, 50° C., 90% RH × 7 days | 1 | 1 | 1 | 1 | 2 | 3 | * | 2 |
| in water, 40° C. × 7 days | 2 | 3 | 2 | 1 | 4 | 4 | * | 4 |
| in water, 20° C. × 7 days | 1 | 2 | 1 | 1 | 2 | 3 | * | 3 |
| Feel to the Touch | S-H | S-H | S | S | S | H | * | H |

Note:
*Blisters occurred in the backing material layer, and the base materials underwent serious thermal shrinkage. No evaluation was made.

TEST EXAMPLE 17

Surface Base Material

A polyester tufted carpet comprising, as a primary base cloth, polyester nonwoven fabric (basis weight: 1000 g/m²) (hereinafter referred to a PET/PET tufted).

Back Base Material

PP spun-bond

Backing Material Composition

| | |
|---|---|
| Acronal S-400 | 100 parts (on resin solid basis) |
| Common Portland cement | 200 parts |
| Calcium carbonate ("KD-80") | 400 parts |
| Water | 80 parts |

The above backing material composition was mixed with a stirrer until no agglomerate was observed (about 15 minutes). The resulting slurry of the backing material composition was coated on the back side of the above surface base material with a knife coater to a wet thickness of 2.5 mm and immediately thereafter the above back base material was superposed thereon. The laminate was lightly pressed through nip rolls and then put on a parting grease-coated iron plate heated at 130° C. with the back base material down and thus heated for 25 minutes to harden and dry the backing material composition. Immediately thereafter, the laminate was allowed to stand at room temperature for cooling. The laminate was press-cut to a size of 50×50 cm to obtain a tile carpet sample.

TEST EXAMPLE 18

Surface Base Material

PET/PET-nylon tufted

Back Base Material

PP spun-bond

Backing Material Composition

| | |
|---|---|
| Acronal 80DN | 100 parts |
| | (on resin solid basis) |
| White cement | 200 parts |
| Silica sand (No. 8) | 400 parts |
| Iron oxide ("NB-500" produced by Nihon Bengara Kogyo Co., Ltd.) | 1 part |
| Water | 80 parts |

A tile carpet sample was prepared in the same manner as in Test Example 17, except for using the above materials.

TEST EXAMPLES 19 TO 31

A tile carpet sample was prepared in the same manner as in Test Example 17, except for making alterations as shown in Table 3 below.

Each of the samples obtained in Test Examples 17 to 31 was tested in the same manner as in Test Example 1, except for using a mandrel having a diameter of 20 mm in the softness test and applying a load of 2 kg/cm$^2$ in the touch test. Further, anti-blocking of the sample to the floor was also tested as follows. The results obtained are shown in Table 4.

Anti-Blocking to Floor

The carpet sample was laid on the floor and pressed under a load of 20 kg/(50 cm × 50 cm) at 60° C. for days. The temperature was returned to room temperature, the pressure was released, and the sample was peeled off the floor. The condition of the floor beneath the sample was examined and evaluated as follows.

1. No pasty substance remained on the floor at all.
2. Substantially no pasty substance remained on the floor.
3. No appreciable pasty substance remained on the floor, but the floor was sticky.
4. A pasty substance remained on the floor.

TABLE 3

| | Backing Material Composition | | | Production Conditions | | | | | Hardened Backing Material Thickness (mm) |
|---|---|---|---|---|---|---|---|---|---|
| Test Example No. | Resin Emulsion (Tg of Resin) (part*) | Hydraulic Inorganic Cement (part) | Non-hydraulic Inorganic Powder (part) | Surface Base Material | Back Base Material | Backing Material Wet Thickness (mm) | Hardening and Drying Conditions Temp. (°C.) | Time (min) | |
| 17 | Acronal S-400 (≦0° C.) (100) | Portland cement (200) | calcium carbonate (400) | PET/PET tufted | PP spun-bond | 2.5 | 130 | 25 | 2.0 |
| 18 | Acronal 80DN (≦0° C.) (100) | white cement (200) | silica sand (No. 8) (400) + iron oxide (1) | PET/PET- nylon tufted | PP spun-bond | " | " | " | " |
| 19 | Acronal S-400 (≦0° C.) (100) | Portland cement (200) | calcium carbonate (400) | PET/PET tufted | PP spun-bond | " | 98 | 45 | " |
| 20 | Acronal S-400 (≦0° C.) (100) | Portland cement (120) | calcium carbonate (400) | PET/PET tufted | PP spun-bond | " | 130 | 25 | " |
| 21 | Acronal S-400 (≦0° C.) (100) | Portland cement (200) | calcium carbonate (600) | PET/PET tufted | PP spun-bond | " | " | " | " |
| 22 | Acronal YJ-3042 (3° C.) (100) | Portland cement (200) | calcium carbonate (400) | PET/PET tufted | PP spun-bond | " | " | " | " |
| 23 | Acronal S-400 (≦0° C.) (100) | Portland cement (200) | calcium carbonate (400) | PET/PET tufted | PP spun-bond | 3.0 | 150 | 50 | 2.4 |
| 24 | Acronal (S-400) (≦0° C.) (100) | Portland cement (400) | calcium carbonate (250) | PET/PET tufted | PP spun-bond | 2.5 | 130 | 25 | 2.0 |
| 25 | Acronal S-400 (≦0° C.) (100) | Portland cement (200) | calcium carbonate (400) | PET/PET tufted | PP spun-bond | " | 65 | 90 | " |
| 26 | Acronal (S-400) (≦0° C.) (100) | Portland cement (200) | calcium carbonate (400) | PET/PET tufted | PP spun-bond | " | 165 | 15 | " |
| 27 | Acronal | Portland | silica sand | PET/PET | PP | " | 120 | 30 | " |

TABLE 3-continued

| Test Example No. | Backing Material Composition | | | Production Conditions | | | | | Hardened Backing Material Thickness (mm) |
|---|---|---|---|---|---|---|---|---|---|
| | Resin Emulsion (Tg of Resin) (part*) | Hydraulic Inorganic Cement (part) | Non-hydraulic Inorganic Powder (part) | Surface Base Material | Back Base Material | Backing Material Wet Thickness (mm) | Hardening and Drying Conditions | | |
| | | | | | | | Temp. (°C.) | Time (min) | |
| | YJ-1650D** (8° C.) (100) | cement (200) | (No. 8) (400) | tufted | spun-bond | | | | |
| 28 | Acronal S-400 (≦0° C.) (100) | Portland cement (100) | calcium carbonate (250) | PET/PET tufted | PP spun-bond | " | " | " | " |
| 29 | Acronal (S-400) (≦0° C.) (100) | Portland cement (430) | calcium carbonate (250) | PET/PET tufted | PP spun-bond | " | " | 25 | " |
| 30 | Acronal S-400 (≦0° C.) (100) | white cement (250) | silica sand (No. 8) (220) | PET/PET tufted | PP spun-bond | " | " | " | " |
| 31 | Acronal (S-400) (≦0° C.) (100) | Portland cement (250) | calcium carbonate (650) | PET/PET tufted | PP spun-bond | " | " | " | " |

Note:
*On a resin solid basis.
**Aqueous emulsion of acrylic ester-styrene copolymer produced by Mitsubishi Yuka Badische Co., Ltd.; solid content: 49%; resin's Tg: 8° C.)

TABLE 4

| Test Results | 17 | 18 | 19 | 20 | 21 | 22 | 23 | 24 |
|---|---|---|---|---|---|---|---|---|
| Softness at 70° C. | 1 | 1 | 1 | 1 | 2 | 2 | 1 | 1 |
| at −5° C. | 2 | 1 | 2 | 1 | 3 | 3 | 2 | 1 |
| Fit to the Floor | 1 | 1 | 2 | 1 | 3 | 3 | 1 | 1 |
| Shrinkage: | | | | | | | | |
| in air, 60° C., 90% RH × 7 days | 1 | 1 | 1 | 2 | 2 | 1 | 1 | 2 |
| in air, 50° C., 90% RH × 7 days | 1 | 1 | 1 | 2 | 2 | 1 | 1 | 1 |
| in water, 40° C. × 7 days | 1 | 2 | 2 | 2 | 3 | 1 | 1 | 2 |
| in water, 20° C. × 7 days | 1 | 1 | 1 | 2 | 2 | 1 | 1 | 2 |
| Feel to the Touch | S | S | S-H | S | S-H | S | S | S |
| Anti-Blocking to Floor | 2 | 2 | 2 | 3 | 1 | 1 | 2 | 3 |

| Test Results | 25 | 26 | 27 | 28 | 29 | 30 | 31 |
|---|---|---|---|---|---|---|---|
| Softness at 70° C. | 2 | * | 3 | 1 | 3 | 1 | 4 |
| at −5° C. | 3 | * | 4 | 1 | 4 | 1 | 4 |
| Fit to the Floor | 3 | * | 4 | 1 | 4 | 1 | 4 |
| Shrinkage: | | | | | | | |
| in air, 60° C., 90% RH × 7 days | 1 | * | — | 2 | 3 | 2 | 3 |
| in air, 50° C., 90% RH × 7 days | 1 | * | — | 4 | 2 | 2 | 2 |
| in water, 40° C. × 7 days | 2 | * | — | 3 | 4 | 3 | 4 |
| in water, 20° C. × 7 days | 1 | * | — | 2 | 3 | 2 | 2 |
| Feel to the Touch | H | * | H | S | H | H | H |
| Anti-Blocking to Floor | 2 | * | 1 | 4 | 1 | 4 | 1 | note:
*Considerable blisters occurred in the backing material layer. No evaluation was made.

TEST EXAMPLE 32

A coating composition having the following formulation was continuously coated on a PET/PET-nylon tufted surface base material to a dry spread of 350 g/m².

| Coating Composition for Surface Base Material: | |
|---|---|
| Aqueous emulsion of acrylic ester-styrene copolymer ("Acronal YJ-2716D" produced by Mitsubishi Yuka Badische Co., Ltd.; solid content: 48%; resin's Tg: 24° C.) | 100 parts (on resin solid basis) |
| Calcium carbonate ("KD-1200" produced | 100 parts |

-continued

| Coating Composition for Surface Base Material: | |
|---|---|
| by Dowa Mining Co., Ltd.) | |
| Antifoamer ("San-Nopco 8034" produced by San-Nopco Chemical Co.) | 0.4 part |
| 10% Sodium tripolyphosphate aqueous solution | 10 parts |
| Water | 100 parts |
| Thickener ("Latekoll D") produced by Mitsubishi Yuka Badische Co., Ltd.) | adequate amount to adjust to 4000 cps |

Separately, a backing material composition having the following formulation was mixed with a stirrer until no agglomerates was observed (for about 15 minutes) and continuously coated on a 500 μm thick polyester film having been treated with a release agent with a knife coater to a wet thickness of 2.0 mm for form a backing material composition sheet. Immediately thereafter, the above-prepared coating composition-coated and undried surface base material (PET/PET-nylon tufted) which was continuously fed was superposed on the backing material composition sheet with the coated side of the surface base material facing to the backing material sheet and press-bonded together by means of rolls. The polyester film side was brought into contact with an iron plate heated to a surface temperature of 140° C and heated for 15 minutes to harden and dry the backing material composition and, at the same time, to dry the coating composition of the surface base material.

| Aqueous emulsion of butyl acrylate-styrene copolymer (solid content: 50%; resin's Tg: −30° C.) (hereinafter referred to as emulsion (1)) | 100 parts (on solid resin basis) |
|---|---|
| Common Portland cement | 200 parts |
| Calcium carbonate ("KD-80") | 250 parts |
| Water | 80 parts |

TEST EXAMPLE 33

A carpet was prepared in the same manner as in Test Example 32, except for replacing the polyester film as a substrate with PET spun-bond (basis weight: 60 g/m²) as a back base material on which the backing material composition was coated and replacing emulsion (1) with an aqueous emulsion of a butyl acrylate-styrene copolymer (solid content: 50%; resin's Tg: −45° C.) (hereinafter referred to as emulsion (2)).

TEST EXAMPLE 34

A 500 μm thick polyester film having been treated with a release agent and a coating composition-coated and undried PET/PET-nylon tufted carpet as prepared in the same manner as in Example 32 were continuously fed between a press table and a rotating roll set above the table at a given gap while feeding the same backing material composition as used in Example 32 between the polyester film and the PET/PET-nylon tufted carpet. The gap between the table and the roll was adjusted so that the backing material composition formed a sheet having a wet thickness of 2 mm and, at the same time, the backing material composition layer and the undried PET/PET-nylon tufted carpet were press-bonded to form an integral laminate. The laminate was taken off and then heated from its polyester film side at 140° C. for 15 minutes in the same manner as in Test Example 32 to thereby harden and dry the backing material composition sheet to obtain a carpet backed with the backing material.

TEST EXAMPLES 35 TO 53

A carpet was prepared in the same manner as in Test Example 32, 33 or 34, except for making alterations as shown in Table 5 below. In Test Example 36, the coating composition for a surface base material contained no filler. In other Test Examples, the kind and the amount of the filler in the composition were the same as in Test Example 32.

Each of the carpets obtained in Test Examples 32 to 53 was press-cut to a size of 50×50 cm and tested in terms of softness, fit to the floor, and feel to the touch in accordance with the same methods as in Test Example 17 and also in terms of shrinkage resistance, anti-blocking to the floor, and pull strength of pile in accordance with the following test methods. The results obtained are shown in Table 6 below.

Shrinkage

The sample was allowed to stand in air at 50° C. and 100% RH for 7 days or 14 days or immersed in water at 20° C. for 1 day or 3 days, and the change of the condition was examined and rated as follows.

1 No change at all.
2 Slight changes (swelling, etc.) were observed.
3 The sample underwent swelling or warp but recovered on drying.
4 Considerable swelling or warp was observed.

2) Anti-Blocking to Floor

Anti-blocking properties were evaluated in the same manner as in Test Example 17, except that a load of 15 kg/(50 cm×50 cm) was applied at 50° C. for 5 days.

3) Pull Strength of Pile

Pull strength of pile (kg/pile) was measured in accordance with JIS L-1021-1979.

TABLE 5

| Test Example No. | Backing Material Composition | | | | Surface Base Material | Coating Composition for Surface Base Material | | | Method and State When Laminated | Hardening and Drying Conditions | |
|---|---|---|---|---|---|---|---|---|---|---|---|
| | Resin Emulsion (Resin's Tg) (part*) | Portland Cement (part) | Non-hydraulic Inorganic Filler (part) | Wet Thickness (mm) | | Resin Emulsion (Resin's Tg) | Dry Spread (g/m²) | | of Laminating | Temp. (°C.) | Time (min) |
| 32 | emulsion (1) (−30° C.) (100) | 200 | calcium carbonate (250) | 2.0 | PET/PET· nylon tufted | Acronal YJ-2716D (24° C.) | 350 | undried | Test Example 32 | 140 | 15 |
| 33 | emulsion (2) (−45° C.) (100) | 200 | silica sand (No. 8) (400) + iron oxide (1) | " | PET/PET· nylon tufted | Acronal YJ-3042D (3° C.) | " | " | Test Example 32** | " | " |
| 34 | emulsion (1) (−30° C.) (100) | 200 | calcium carbonate (250) | " | PET/PET· nylon tufted | Acronal YJ-2716D (24° C.) | " | " | Test Example 34 | 100 | 40 |
| 35 | emulsion (1) (−30° C.) (100) | 160 | calcium carbonate (410) | " | PET/PET· nylon tufted | Acronal YJ-2716D (24° C.) | " | " | Test Example 32 | 140 | 15 |
| 36 | emulsion (1) (−30° C.) (100) | 200 | calcium carbonate (410) | " | PET/PET· nylon tufted | Acronal YJ-2716D (24° C.) | 85 | " | Test Example 32 | " | " |
| 37 | Acronal YJ-3042D (3° C.) (100) | 200 | calcium carbonate (400) | " | PET/PET· nylon tufted | Acronal YJ-2716D (24° C.) | 350 | " | Test Example 32 | " | " |
| 38 | emulsion (1) (−30° C.) (100) | 200 | calcium carbonate (250) | 2.0 | PET/PET· nylon tufted | Acronal YJ-2716D (24° C.) | 350 | undried | Test Example 32 | 155 | 14 |
| 39 | emulsion | 200 | calcium | " | PET/PET· | Acronal | " | " | Test | 140 | 15 |

TABLE 5-continued

| Test Example No. | Backing Material Composition Resin Emulsion (Resin's Tg) (part*) | Portland Cement (part) | Non-hydraulic Inorganic Filler (part) | Wet Thickness (mm) | Surface Base Material | Coating Composition for Method Resin Emulsion (Resin's Tg) | Dry Spread (g/m²) | State When Laminated | Method and Drying of Laminating | Hardening Conditions Temp. (°C.) | Time (min) |
|---|---|---|---|---|---|---|---|---|---|---|---|
| | (1) (−30° C.) (100) | | carbonate (250) | | nylon tufted | YJ-2716D (24° C.) | | | Example 34 | | |
| 40 | emulsion (1) (−30° C.) (100) | 200 | calcium carbonate (250) | " | PET/PET• nylon tufted | Acronal YJ-2716D (24° C.) | " | " | Test Example 33 | " | 17 |
| 41 | emulsion (1) (−30° C.) (100) | 120 | calcium carbonate (400) | " | PET/PET• nylon tufted | Acronal YJ-2716D (24° C.) | " | " | Test Example 33 | " | " |
| 42 | emulsion (1) (−30° C.) (100) | 200 | calcium carbonate (600) | 4.0 | PET/PET• nylon tufted | Acronal YJ-2716D (24° C.) | " | " | Test Example 34*** | " | " |
| 43 | emulsion (1) (−30° C.) (100) | 400 | calcium carbonate (600) | 2.0 | PET/PET• nylon tufted | Acronal YJ-2716D (24° C.) | " | " | Test Example 33 | " | " |
| 44 | emulsion (2) (−45° C.) (100) | 200 | silica sand (No. 8) (400) + iron oxide (1) | " | PET/PET• nylon tufted | Acronal YJ-3042D (3° C.) | " | dried | Test Example 32** | 100 | 25 |
| 45 | emulsion (1) (−30° C.) (100) | 200 | calcium carbonate (250) | 2.0 | PET/PET• nylon tufted | Acronal YJ-2716D (24° C.) | 350 | undried | Test Example 32 | 80 | 120 |
| 46 | emulsion (1) (−30° C.) (100) | " | calcium carbonate (250) | " | PET/PET• nylon tufted | Acronal YJ-2716D (24° C.) | " | " | Test Example 32 | 176 | 12 |
| 47 | Acronal YJ-1650D (8° C.) (100) | 200 | calcium carbonate (300) | " | PET/PET• nylon tufted | Acronal YJ-2716D (24° C.) | " | " | Test Example 32 | 140 | 15 |
| 48 | emulsion (1) (−30° C.) (100) | 100 | calcium carbonate (250) | " | PET/PET• nylon tufted | Acronal YJ-2716D (24° C.) | " | " | Test Example 33 | " | " |
| 49 | emulsion (1) (−30° C.) (100) | 450 | calcium carbonate (250) | " | PET/PET• nylon tufted | Acronal YJ-2716D (24° C.) | " | " | Test Example 33 | " | " |
| 50 | emulsion (1) (−30° C.) (100) | 200 | silica sand No. 8 (140) | " | PET/PET• nylon tufted | Acronal YJ-2716D (24° C.) | " | " | Test Example 32 | " | " |
| 51 | emulsion (1) (−30° C.) (100) | 200 | silica sand No. 8 (650) | 2.0 | PET/PET• nylon tufted | Acronal YJ-2716D (24° C.) | 350 | undried | Test Example 33 | 140 | 15 |
| 52 | emulsion (1) (−30° C.) (100) | " | calcium carbonate (250) | 1.0 | PET/PET• nylon tufted | emulsion (1) (−30° C.) | " | " | Test Example 32 | " | " |
| 53 | emulsion (3)**** (−54° C.) (100) | " | calcium carbonate (250) | 2.0 | PET/PET• nylon tufted | Acronal YJ-2716D (24° C.) | " | " | Test Example 34 | " | 17 |

Note:
*On a resin solid basis.
**Test Example 32 was followed, except for using PET spun-bond in place of the polyester film.
***Test Example 34 was followed, except for using PET spun-bond in place of the polyester film.
****Aqueous emulsion of a butyl acrylate polymer (solid content: 50%; resin's Tg: −54° C.).

TABLE 6

| Test Results | 32 | 33 | 34 | 35 | 36 | 37 | 38 | 39 | 40 | 41 | 42 |
|---|---|---|---|---|---|---|---|---|---|---|---|
| Softness at 70° C. | 1 | 1 | 1 | 1 | 1 | 2 | 1 | 1 | 1 | 1 | 2 |
| −5° C. | 2 | 1 | 2 | 1 | 2 | 3 | 2 | 2 | 2 | 1 | 3 |
| Fit to Floor | 1 | 1 | 1 | 1 | 1 | 3 | ,1 | ,1 | 1 | 1 | 3 |

TABLE 6-continued

| Shrinkage: | | | | | | | | | | | |
|---|---|---|---|---|---|---|---|---|---|---|---|
| in air, 50° C., 100% RH × 7 days | 1 | 1 | 1 | 1 | 1 | 1 | 1 | 1 | 1 | 1 | 2 |
| in air, 50° C., 100% RH × 14 days | 1 | 1 | 1 | 2 | 1 | 1 | 1 | 1 | 1 | 2 | 2 |
| in water, 20° C. × 1 day | 1 | 1 | 1 | 2 | 1 | 1 | 1 | 1 | 1 | 2 | 2 |
| in water, 20° C. × 3 days | 1 | 2 | 1 | 2 | 1 | 1 | 1 | 1 | 1 | 2 | 2 |
| Feel to the Touch | S | S | S | S | S | S-H | S | S | S | S | H |
| Anti-blocking to Floor | 2 | 1 | 2 | 3 | 2 | 1 | 2 | 2 | 1 | 3 | 2 |
| Appearance (Blister) | good | good | good | good | good | good | good | good | good | good | good |
| Pull Strength of pile (kg/pile) | 4.6 | 3.3 | ≧5.0 | 4.1 | 3.0 | 4.5 | 4.3 | ≧5.0 | 4.5 | 4.2 | ≧5.0 |

| Test Results | 43 | 44 | 45 | 46 | 47 | 48 | 49 | 50 | 51 | 52 | 53 |
|---|---|---|---|---|---|---|---|---|---|---|---|
| Softness at 70° C. | 2 | 1 | 2 | * | 3 | 1 | 3 | 1 | 3 | 1 | 1 |
| −5° C. | 3 | 1 | 2 | * | 4 | 1 | 4 | 1 | 3 | 2 | 1 |
| Fit to Floor | 3 | 1 | 3 | * | 4 | 1 | 4 | 1 | 4 | 2 | 1 |
| Shrinkage: | | | | | | | | | | | |
| in air, 50° C., 100% RH × 7 days | 2 | 1 | 1 | * | 1 | 2 | 2 | 2 | 2 | 1 | 1 |
| in air, 50° C., 100% RH × 14 days | 3 | 1 | 1 | * | 1 | 4 | 3 | 2 | 3 | 2 | 2 |
| in water, 20° C. × 1 day | 2 | 1 | 1 | * | 1 | 3 | 3 | 2 | 3 | 1 | 2 |
| in water, 20° C. × 3 days | 2 | 2 | 1 | * | 1 | 4 | 4 | 3 | 4 | 2 | 3 |
| Feel to the Touch | H | S | H | * | H | S | H | S | H | S | S |
| Anti-blocking to Floor | 2 | 1 | 2 | * | 1 | 4 | 1 | 4 | 1 | 2 | 4 |
| Appearance (Blister) | good | good | good | * | good | good | good | good | good | good | good |
| Pull Strength of pile (kg/pile) | 4.1 | 2.3 | 4.5 | * | 4.7 | 3.8 | 4.9 | 4.3 | 3.7 | 2.5 | ≧5.0 |

Note:
*Since considerable blisters occurred between the backing material layer and the surface base material, no evaluation was made.

TEST EXAMPLE 54

Surface Base Material

PET/PET tufted was coated with a coating composition having the following formulation to a dry spread of 350 g/m² and dried.

Coating Composition for Surface Base Material

| Acronal YJ-2716D | 100 parts |
|---|---|
| | (on resin solid basis) |
| Calcium carbonate ("KD-1200") | 100 parts |
| Antifoamer ("San-Nopco 8034") | 0.4 part |
| 10% Sodium tripolyphosphate aqueous solution | 10 parts |
| Water | 100 parts |
| Thickener ("Latekoll D") | adequate amount to adjust to 4000 cps |

Backing Material Composition

| Emulsion (1) | 100 parts |
|---|---|
| | (on resin solid basis) |
| Common Portland cement | 100 parts |
| Calcium carbonate ("KD-80") | 250 parts |
| Water | 80 parts |

The above backing material composition was mixed with a stirrer until no agglomerates was observed (for about 15 minutes), and the resulting slurry of the backing material composition was coated on a Teflon sheet with a knife coater to a wet thickness of 2.0 mm to form a sheet. Immediately thereafter, the above-prepared coating composition-coated surface base material was superposed thereon with the coated side down and lightly pressed through nip rolls for laminating. The resulting laminate was placed on an iron plate heated to a surface temperature of 100° C. with the Teflon sheet side in contact with the iron plate and heated at that temperature for 25 minutes to thereby harden and dry the backing material composition, followed by allowing to cool to room temperature.

The pull strength of pile of the resulting carpet was 3.0 kg/pile.

TEST EXAMPLE 55

A coating composition-coated surface base material was prepared in the same manner as in Test Example 54, except for replacing PET/PET tufted with PET/PET-nylon tufted as a surface base material and replacing Acronal YJ-2716D with Acronal YJ-3042D.

Backing Material Composition

| Emulsion (2) | 100 parts |
|---|---|
| | (on resin solid basis) |
| White cement | 200 parts |
| Silica sand No. 8 | 400 parts |
| Iron oxide ("NB-500") | 1 part |
| Water | 80 parts |

A tufted carpet was prepared in the same manner as in Test Example 54, except for using the above prepared coating composition-coated surface base material and the above backing material composition.

TEST EXAMPLES 56 TO 68

A carpet was prepared in the same manner as in Test Example 54, except for making alterations as shown in Table 7 below. In Test Examples 56 and 68, the coating composition for a surface base material contained no filler. In those unmarked, the kind and the amount of the filler in the composition were the same as in Test Example 54.

TEST EXAMPLE 69

A carpet was prepared in the same manner as in Test Example 54, except for replacing the Teflon sheet with a 1 mm thick stainless steel plate as a substrate on which the backing material composition was to be coated. The backing material composition sheet underwent slight damage due to adhesion to the stainless steel plate substrate, but the resulting carpet exhibited the same performance as that of the carpet of Test Example 54.

TEST EXAMPLE 70

A carpet was prepared in the same manner as in Test Example 54, except that no resin emulsion was coated on the surface base material. The pull strength of pile was 1.5 kg/pile.

Each of the carpets obtained in Test Examples 54 to 70 was press-cut to a size of 50×50 cm and tested in the same manner as in Test Example 32. The results obtained are shown in Table 8 below.

TABLE 7

| Test Example No. | Backing Material Composition | | | Wet Thickness (mm) | Surface Base Material | Coating Composition for Surface Base Material | | Hardening and Drying Conditions | | Hardened Backing Material Thickness (mm) |
|---|---|---|---|---|---|---|---|---|---|---|
| | Resin Emulsion (Resin's Tg) (part*) | Hydraulic Inorganic Cement (part) | Non-Hydraulic Inorganic Filler (part) | | | Resin Emulsion (Resin's Tg) | Dry Spread (g/m²) | Temp. (°C.) | Time (min) | |
| 54 | emulsion (1) (−30° C.) (100) | Portland cement (200) | calcium carbonate (250) | 2.0 | PET/PET tufted | Acronal YJ-2716D (24° C.) | 350 | 100 | 35 | 1.9 |
| 55 | emulsion (2) (−45° C.) (100) | white cement (200) | silica sand No. 8 (400) + iron oxide (1) | " | PET/PET• nylon tufted | Acronal YJ-3042D (3° C.) | " | " | " | " |
| 56 | emulsion (1) (−30° C.) (100) | Portland cement (200) | calcium carbonate (250) | " | PET/PET tufted | Acronal YJ-2716D (24° C.) | " | 88 | 55 | " |
| 57 | emulsion (1) (−30° C.) (100) | Portland cement (160) | calcium carbonate (400) | " | PET/PET tufted | Acronal YJ-27164D (24°C.) | " | 100 | 35 | " |
| 58 | emulsion (1) (−30° C.) (100) | Portland cement (200) | calcium carbonate (400) | " | PET/PET tufted | Acronal YJ-3042D (3° C.) | 85 | " | " | " |
| 59 | Acronal YJ-3042D (3° C.) (100) | Portland cement (200) | calcium carbonate (400) | " | PET/PET tufted | Acronal YJ-2716D (24° C.) | 350 | " | " | " |
| 60 | emulsion (1) (−30° C.) (100) | Portland cement (200) | calcium carbonate (200) + aluminum hydroxide (200) | 2.5 | PET/PET tufted | Acronal YJ-2716D (24° C.) | " | 130 | 30 | 2.2 |
| 61 | emulsion (1) (−30° C.) (100) | Portland cement (200) | calcium carbonate (300) | 2.0 | PET/PET tufted | Acronal YJ-2716D (24° C.) | " | 65 | 120 | 1.7 |
| 62 | emulsion (1) (−30° C.) (100) | Portland cement (200) | calcium carbonate (300) | " | PET/PET tufted | Acronal YJ-2716D (24° C.) | " | 160 | 15 | 2.0 |
| 63 | Acronal YJ-1650D (8° C.) (100) | Portland cement (200) | silica sand No. 8 (300) | " | PET/PET tufted | Acronal YJ-2716D (24° C.) | " | 120 | 35 | " |
| 64 | emulsion (1) (−30° C.) (100) | Portland cement (100) | calcium carbonate (250) | " | PET/PET tufted | Acronal YJ-2716D (24° C.) | " | " | " | " |
| 65 | emulsion (1) (−30° C.) (100) | Portland cement (450) | calcium carbonate (250) | " | PET/PET tufted | Acronal YJ-2716D (24° C.) | " | " | " | " |
| 66 | emulsion (1) (−30° C.) (100) | white cement (200) | silica sand No. 8 (140) | " | PET/PET tufted | Acronal YJ-2716D (24° C.) | " | " | " | " |
| 67 | emulsion (1) (−30° C.) (100) | white cement (200) | silica sand No. 8 (500) | " | PET/PET tufted | Acronal YJ-2716D (24° C.) | " | " | " | " |
| 68 | emulsion (3) (−54° C.) (100) | Portland cement (200) | calcium carbonate (250) | " | PET/PET tufted | Acronal YJ-2716D (24° C.) | " | 100 | 40 | 1.9 |
| 70 | emulsion (1) (−30° C.) (100) | Portland cement (200) | calcium carbonate (250) | " | PET/PET tufted | No coating was applied. | | " | 35 | " |

TABLE 7-continued

| Test Example No. | Backing Material Composition | | | | | Coating Composition for Surface Base Material | | Hardening and Drying Conditions | | Hardened Backing Material |
| | Resin Emulsion (Resin's Tg) (part*) | Hydraulic Inorganic Cement (part) | Non-Hydraulic Inorganic Filler (part) | Wet Thickness (mm) | Surface Base Material | Resin Emulsion (Resin's Tg) | Dry Spread (g/m²) | Temp. (°C.) | Time (min) | Thickness (mm) |
| --- | --- | --- | --- | --- | --- | --- | --- | --- | --- | --- |
| | (100) | | | | | | | | | |

Note:
*On a resin solid basis.

TABLE 8

| Test Results | 54 | 55 | 56 | 57 | 58 | 59 | 60 | 61 |
| --- | --- | --- | --- | --- | --- | --- | --- | --- |
| Softness at 70° C. | 1 | 1 | 1 | 1 | 1 | 2 | 1 | 2 |
| −5° C. | 2 | 1 | 2 | 1 | 2 | 3 | 2 | 2 |
| Fit to Floor | 1 | 1 | 2 | 1 | 1 | 3 | 1 | 3 |
| Shrinkage: | | | | | | | | |
| in air, 50° C., 100% RH × 7 days | 1 | 1 | 1 | 1 | 1 | 1 | 1 | 1 |
| in air, 50° C., 100% RH × 14 days | 1 | 1 | 1 | 2 | 1 | 1 | 1 | 1 |
| in water, 20° C. × 1 day | 1 | 1 | 1 | 2 | 1 | 1 | 1 | 1 |
| in water, 20° C. × 3 days | 1 | 2 | 1 | 2 | 1 | 1 | 1 | 1 |
| Feel to the Touch | S | S | S-H | S | S | S-H | S | H |
| Anti-Blocking to Floor | 2 | 3 | 2 | 3 | 2 | 1 | 2 | 2 |
| Pull Strength of pile (kg/pile) | 3.0 | 2.3 | 3.3 | 2.8 | 2.1 | 3.0 | 2.9 | 3.1 |

| Test Results | 62 | 63 | 64 | 65 | 66 | 67 | 68 | 70 |
| --- | --- | --- | --- | --- | --- | --- | --- | --- |
| Softness at 70° C. | * | 3 | 1 | 3 | 1 | 3 | 1 | 1 |
| −5° C. | * | 4 | 1 | 4 | 1 | 3 | 1 | 2 |
| Fit to Floor | * | 4 | 1 | 4 | 1 | 4 | 1 | 1 |
| Shrinkage: | | | | | | | | |
| in air, 50° C., 100% RH × 7 days | * | — | 2 | 2 | 2 | 2 | 1 | 1 |
| in air, 50° C., 100% RH × 14 days | * | — | 4 | 3 | 2 | 3 | 2 | 1 |
| in water, 20° C. × 1 day | * | — | 3 | 3 | 2 | 3 | 2 | 1 |
| in water, 20° C. × 3 days | * | — | 4 | 4 | 3 | 4 | 3 | 2 |
| Feel to the Touch | * | H | S | H | H | H | S | S |
| Anti-Blocking to Floor | * | 1 | 4 | 1 | 4 | 1 | 4 | 2 |
| Pull Strength of Pile (kg/pile) | * | 3.2 | 2.7 | 3.3 | 3.1 | 2.8 | 3.0 | 1.5 |

Note:
*Since considerable blisters occurred between the backing material layer and the surface base material, no evaluation was made.

While the invention has been described in detail and with reference to specific examples thereof, it will be apparent to one skilled in the art that various changes and modifications can be made therein without departing from the spirit and scope thereof.

What is claimed is:

1. A process for producing a carpet comprising the steps of:
   a) coating a a carpeting surface base material with a coating composition comprising an aqueous emulsion of a resin having a glass transition point of from −10° to 30° C.;
   b) subsequently laminating a backing material composition comprising 100 parts by weight, on a resin solid basis, of an aqueous emulsion of a resin having a glass transition point of not higher than 5° C., from 120 to 400 parts by weight of a hydraulic inorganic cement, and up to 600 parts by weight of a non-hydraulic inorganic filler on said carpeting surface base material which has been previously coated with said coating composition; and
   c) heating the laminate to harden and dry the backing material composition.

2. A process as claimed in claim 1, wherein said resin of the aqueous emulsion in said backing material composition has a glass transition point of from −50° to 0° C.

3. A process as claimed in claim 1, wherein said hydraulic inorganic cement in said backing material composition is present in an amount of from 160 to 300 parts by weight per 100 parts by weight of the aqueous resin emulsion on a resin solid basis.

4. A process as claimed in claim 1, wherein said coating composition contains from 100 to 400 parts by weight of a non-hydraulic inorganic filler per 100 parts by weight of the resin solid content.

5. A process as claimed in claim 1, wherein said backing material composition is laminated on the coating composition-coated side of said carpeting surface base material before said coating composition coated on said carpeting surface base material is dried.

6. A process as claimed in claim 5, wherein a carpeting back base material is used, said backing material composition is coated on the coating composition-coated side of said carpeting surface base material and/or on the back base material, and both the base materials are laminated by press-bonding before said backing material composition is hardened and dried.

7. A process as claimed in claim 6, wherein said non-hydraulic inorganic filler in said backing material composition is present in an amount of from 160 to 460 parts by weight per 100 parts by weight of the aqueous resin emulsion on a resin solid basis.

8. A process as claimed in claim 5, wherein said backing material composition is coated on said carpeting surface base material and/or on a substrate, and both the surface base material and substrate are laminated by press-bonding before said backing material composition is hardened and dried.

9. A process as claimed in any one claim of claims 4, 5, 6 or 8, wherein said heating is at a temperature of from 130° to 155° C.

10. A process as claimed in claim 1, wherein said backing material composition is laminated on the coating composition-coated side of said carpeting surface base material after said coating composition coated on the carpeting surface base material is dried.

11. A process as claimed in claim 10, wherein said backing material composition is coated on the coating composition-coated side of said carpeting surface base material and/or on a substrate, and both the surface base material and substrate are laminated by press-bonding before said backing material composition is hardened and dried.

12. A process as claimed in any one claim of claims 10 or 11, wherein said heating is at a temperature of from 90° to 125° C.

* * * * *